United States Patent
Babington et al.

(10) Patent No.: US 8,499,755 B2
(45) Date of Patent: Aug. 6, 2013

(54) MOBILE KITCHEN

(75) Inventors: Robert S. Babington, McLean, VA (US); Juan C. Lemus, Rocky Mount, NC (US); Ramiro Andrade, Nashville, NC (US); Larry Viverette, Macclesfield, NC (US); Luther Barnes, Rocky Mount, NC (US); Victor Worsley, Battleboro, NC (US)

(73) Assignee: Babington Enterprises, McLean, VA (US)

( * ) Notice: Subject to any disclaimer, the term of this patent is extended or adjusted under 35 U.S.C. 154(b) by 369 days.

(21) Appl. No.: 12/250,389

(22) Filed: Oct. 13, 2008

(65) Prior Publication Data

US 2010/0089378 A1 Apr. 15, 2010

(51) Int. Cl.
A47G 23/04 (2006.01)

(52) U.S. Cl.
USPC .............. 126/268; 126/21 A; 126/84; 126/80; 454/116

(58) Field of Classification Search
USPC ................... 126/80, 84, 21 R, 276, 268, 279, 126/299 D, 299 R, 300; 296/22; 454/83, 454/99, 100, 115, 116, 354
See application file for complete search history.

(56) References Cited

U.S. PATENT DOCUMENTS

| | | | | |
|---|---|---|---|---|
| 1,346,883 A * | 7/1920 | Frederick | .......................... | 126/80 |
| 2,687,127 A * | 8/1954 | Leffler | ....................... | 126/307 R |
| 2,754,816 A * | 7/1956 | Ryder | ....................... | 126/307 R |
| 2,764,972 A * | 10/1956 | Ryder | ....................... | 126/307 A |
| 3,040,734 A * | 6/1962 | Amy | .......................... | 126/307 R |
| 3,067,735 A * | 12/1962 | Albert | ....................... | 126/110 AA |
| 3,242,652 A * | 3/1966 | Malenchini | ..................... | 96/233 |
| 3,272,358 A * | 9/1966 | Fred | ............... | 414/520 |
| 3,340,380 A * | 9/1967 | Molitor | .......................... | 219/386 |
| 3,614,949 A * | 10/1971 | Goodgion | ....................... | 126/80 |
| 3,627,986 A * | 12/1971 | Anderson | ............... | 219/452.12 |
| 3,643,646 A * | 2/1972 | Honaker, Jr. | ................ | 126/85 B |
| 3,855,814 A * | 12/1974 | Eubank | .............. | 62/244 |
| 4,082,196 A * | 4/1978 | Lutz et al. | ..................... | 414/521 |
| 4,089,327 A | 5/1978 | Welsh | | |
| 4,111,318 A * | 9/1978 | Lutz | .............................. | 414/521 |
| 4,113,122 A * | 9/1978 | Lutz | .............................. | 414/527 |
| 4,199,292 A * | 4/1980 | Kasten | .......................... | 414/519 |
| 4,204,592 A * | 5/1980 | Lutz et al. | .................. | 198/750.1 |

(Continued)

FOREIGN PATENT DOCUMENTS

| | | | |
|---|---|---|---|
| CH | 682512 A5 | * | 9/1993 |
| GB | 579420 A | | 8/1946 |
| JP | 06281171 A | * | 10/1994 |

*Primary Examiner* — Steven B McAllister
*Assistant Examiner* — Desmond C Peyton
(74) *Attorney, Agent, or Firm* — Novak Druce Connolly Bove + Quigg LLP

(57) ABSTRACT

A mobile kitchen comprises a housing disposed atop one or more wheel axles and a plurality of appliances disposed within the housing. Each appliance is heated by combustion of a distillate fuel. One or more air channels are disposed about each of the appliances, such that each air channel substantially isolates excess heat from combustion of the distillate fuel from a workspace within the housing. One or more first air blowers are associated with the air channels, and each is adapted to force air through the air channels and vent the excess heat to the exterior of the housing. One or more second air blowers are coupled to the housing, and each second air blower is adapted to vent a predetermined volume of air from within the workspace at least once per minute.

19 Claims, 5 Drawing Sheets

U.S. PATENT DOCUMENTS

| | | | | |
|---|---|---|---|---|
| 4,270,319 A * | 6/1981 | Spasojevic | | 52/36.2 |
| 4,295,679 A * | 10/1981 | Artweger et al. | | 296/171 |
| 4,362,922 A * | 12/1982 | Anderson | | 392/368 |
| 4,428,357 A * | 1/1984 | Field | | 126/299 R |
| 4,467,782 A * | 8/1984 | Russell | | 126/299 D |
| 4,522,191 A * | 6/1985 | Knowles et al. | | 126/307 R |
| 4,527,542 A * | 7/1985 | Bales et al. | | 126/299 D |
| 4,601,509 A * | 7/1986 | Ellis, Sr. | | 296/22 |
| 4,699,207 A * | 10/1987 | Hanemaayer | | 165/41 |
| 5,000,160 A * | 3/1991 | Dunlop et al. | | 126/299 D |
| 5,012,793 A * | 5/1991 | Guzorek | | 126/85 B |
| 5,067,608 A * | 11/1991 | McLellan | | 198/817 |
| 5,232,010 A * | 8/1993 | Rozenblatt et al. | | 137/347 |
| 5,285,604 A * | 2/1994 | Carlin | | 52/79.1 |
| 5,307,645 A * | 5/1994 | Pannell | | 62/244 |
| 5,312,296 A * | 5/1994 | Aalto et al. | | 454/66 |
| 5,364,221 A | 11/1994 | Theurer et al. | | |
| 5,389,035 A * | 2/1995 | Ishida et al. | | 454/99 |
| 5,531,641 A * | 7/1996 | Aldrich | | 454/100 |
| 5,771,879 A * | 6/1998 | Saltzman | | 126/299 R |
| 5,833,295 A * | 11/1998 | Farlow, Jr. | | 296/22 |
| 6,189,944 B1 * | 2/2001 | Piche | | 296/22 |
| 6,543,437 B1 * | 4/2003 | Luu et al. | | 126/85 B |
| 6,634,352 B2 * | 10/2003 | Maiello | | 126/307 R |
| 7,380,548 B2 * | 6/2008 | Ryan et al. | | 126/25 R |
| 2003/0179653 A1 * | 9/2003 | McLemore et al. | | 368/10 |
| 2007/0012198 A1 * | 1/2007 | Glier | | 99/403 |

* cited by examiner

MOBILE KITCHEN

BACKGROUND OF THE INVENTION

1. Field of the Invention

The field of the present invention is mobile kitchens.

2. Background

Presently, mobile kitchens come in a couple of different varieties. A first type, which is mobile only through considerable efforts, has the kitchen necessities, including appliances, food, serving equipment, etc. packed up in a trailer. For use, everything must be removed from a trailer and set up in a separate building or tent. In order to move the kitchen, everything must be packed up, back into the trailer for transport. Convenience of use is not a strong point for these types of mobile kitchens.

A second type of mobile kitchen has all the appliances and other kitchen necessities arranged in a trailer for use within the trailer. While this type of kitchen is more mobile, it too can have its drawbacks. Because space within such a trailer is necessarily confined, heat from the cooking appliances can remain trapped within the trailer, sometimes raising the temperature within the kitchen to well over 120° F. This problem can be exacerbated by cooking appliances that make use of noisy, open flame burners to cook food, or otherwise have an uncontrolled excess noise and/or heat output, or when the mobile kitchen is used in hot climates. Another issue that sometimes arises with these mobile kitchens is the production and entrapment of smoke, noxious gases, and carbon build-up within the trailer. These undesirable elements are most frequently produced either because of the type of fuel burned, or the combustion process is incapable of fully burning the fuel that is used, and because the cooking appliances most commonly installed in these mobile kitchens use open flames as a heat source.

SUMMARY OF THE INVENTION

The present invention is directed toward a mobile kitchen. A housing is disposed atop one or more wheel axles, and a plurality of appliances are disposed within the housing. Each appliance is heated by combustion of a distillate fuel. One or more air channels are disposed about each of the appliances, with each air channel being adapted to substantially isolate excess heat from combustion of the distillate fuel from the workspace within the kitchen. One or more first air blowers are associated with the air channels, and these air blowers are adapted to force air through the air channels so that the excess heat is vented to an exterior of the housing. One or more second air blowers are coupled to the housing, with each of these second air blower being adapted to replace a predetermined volume of air from within the workspace at least once per minute.

Additional options may be incorporated into this mobile kitchen. As one option, a single air channel may be disposed about multiple appliances. As another option, the air channels vent to an underside of the housing. As yet another option, at least one of the first air blowers draws air from the underside of the housing. As yet another option, the exhaust channel for each appliance vents to an exterior of the housing on a different side from where the first air blowers draw air. As yet another option, each appliance vents to a top side of the housing. As yet another option, within the housing, the exhaust channels for the appliances comprise double-walls. Where double-walls are used, space between the walls may be cooled by air from one or more of the air channels. As yet another option, at least one of the first air blowers may be positioned to direct air directly into one of the liquid fuel burners used to heat one of the appliances. As yet another option, the mobile kitchen may include a storage space having a base wall formed by a conveyor belt system. As yet another option, the mobile kitchen may include separate potable and grey water reservoirs. Additional options will be evident from the detailed description below. Any of the options may be incorporated into the mobile kitchen individually or in combination with any of the other options.

Accordingly, an improved mobile kitchen is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
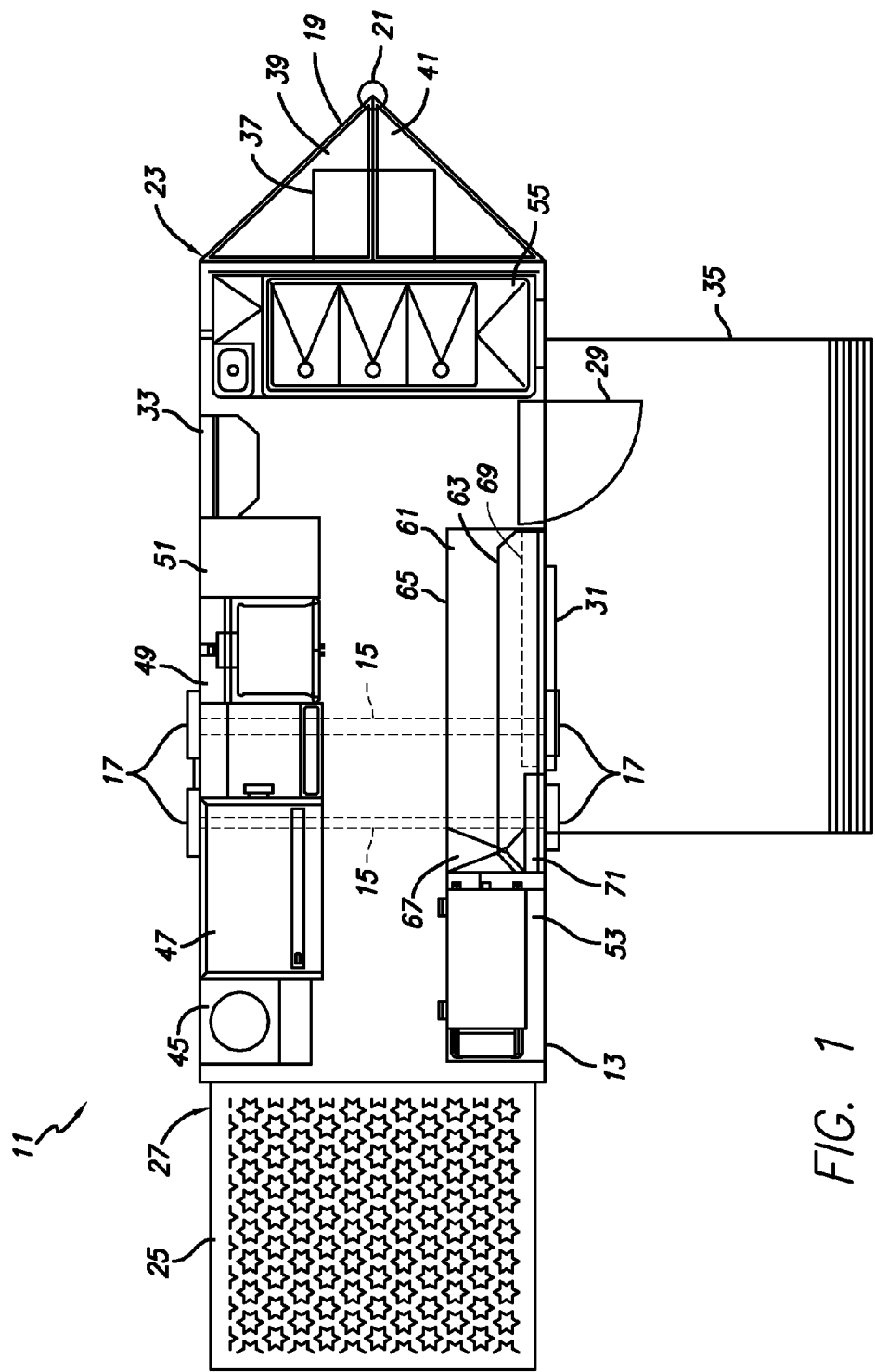
FIG. 1 schematically illustrates a floor plan layout for a mobile kitchen.

Turning in detail to the drawings, FIG. 1 illustrates an exemplary floor plan for a mobile kitchen 11. This mobile kitchen 11 is constructed as a towable trailer which has an outer shell or housing 13 placed atop multiple wheel axles 15 and wheels 17. Such trailers are commonly known to those of skill in the art and may have any form of construction to suit particular application needs. As shown, the mobile kitchen 11 includes a towing extension 19 and hitch 21 on the forward end 23 and a fold down gate or ramp 25 on the rearward end 27. In addition, a side door 29 is included, along with a service window 31, a secondary window 33, and an exterior awning 35. In order to provide electricity to the mobile kitchen 11, a generator 37 is mounted on the exterior forward end above the tow extension 19. An electrical junction box (not shown), including breakers, may also be mounted next to the generator 37 to aid in providing shore power and distributing electricity throughout the trailer. Similarly, dual fuel tanks 39, 41 are disposed on the tow extension 19. One of the fuel tanks 39 provides fuel for the generator, while the other fuel tank provides fuel to each of the various appliances within the trailer which require fuel for operation. In the event that a single type of fuel source will always be used for both the generator and the appliances, a single fuel tank may be used. More than two fuel tanks may also be used.

The interior of the trailer includes several kitchen appliances, such as a stock pot cooker 45, a griddle 47, a convection oven 49, a refrigerator 51, a tray ration heater 53, and a sanitation unit 55. Of course, the number and type of appliances placed within the mobile kitchen may be changed, rearranged, or altered according to any desired specific purpose for the mobile kitchen. An exemplary stock pot cooker is described in U.S. patent application Ser. No. 12/173,895, filed on Jul. 16, 2008. An exemplary griddle is disclosed in U.S. patent application Ser. No. 12/167,338, filed Jul. 3, 2008. An exemplary convection oven is disclosed in U.S. patent application Ser. No. 12/167,330, filed Jul. 3, 2008. An exemplary tray ration heater is disclosed in U.S. Pat. No. 7,100,599, while an exemplary sanitation unit is disclosed in U.S. Pat. No. 6,453,487. Each of the aforementioned patent applications and patents is incorporated herein by reference in their entirety.

The liquid fuel burner, which may be used to heat each of these appliances, is preferably of the type generally described in U.S. Pat. No. 4,298,338. Advancements in this type of liquid fuel burner may be found in U.S. Pat. No. 4,507,076, U.S. Pat. No. 4,573,904, and U.S. patent application Ser. No. 12/173,902, filed Jul. 16, 2008. The disclosures of each of these patents and patent application, pertaining to liquid fuel burners and advancements therein, are incorporated herein by reference in their entirety. Such liquid fuel burners are available from Babington Technology of McLean, Va., and are advantageous because they can burn any distillate fuel efficiently and cleanly without smoke, odor, or carbon monoxide emissions.

Also included in the mobile kitchen 11 are a small hand washing sink 57 to one side of the sanitation unit and a refrigerator 51 disposed adjacent the convection oven. The refrigerator 51 may be a combination refrigerator/freezer, a full freezer, or any other combination of refrigeration and freezer according to particular needs. A service counter 61 is disposed adjacent the service window 31, and overhead cabinets 63 are included above the service window 31 and service counter 61. Additional lower storage cabinets 65 are included beneath the service counter 61, one of which houses a potable water reservoir 67. These lower storage cabinets 65 may be insulated, as desired, and used for hot storage, cold storage, dry storage, or for any other desired purpose. For hot or cold storage, appropriate equipment may be included in the lower storage cabinets (or in any other cabinet) to regulate temperature. In the mobile kitchen 11 shown, a single long storage space 69 is included underneath the service counter 61, behind the lower storage cabinets 65 and adjacent the trailing housing 13, with access adjacent the side door 29. This storage space 69 is configured to store portable water tanks, although it may be sized for any other purpose as well. In order to make storage of portable water tanks more convenient in the long storage space 69, a conveyor belt system is used as the base wall of the storage space 69, so that several portable water tanks may be easily placed in, and subsequently retrieved from the storage space 69 by forward or reverse activation of the conveyor belt system. Finally, an informational computer system 71 are placed just above the service counter 61 and adjacent the service window 31. The computer 71 may be electronically connected to each of the appliances, tanks, generators, etc. to monitor statistics such as heat, fuel consumption, fuel levels, water levels, running times, and any other desired measurable parameter. The computer is preferably not used to control any of the appliances or blowers (see below), since it is desired that the appliances and blowers should remain operative and active, even in the event that the computer fails or encounters an error causing one or more of the computer applications to crash. However, safeguards could be put in place to prevent a computer crash from melting the appliances and blowers, if the computer is set to control operation of these devices.

Figure 2:
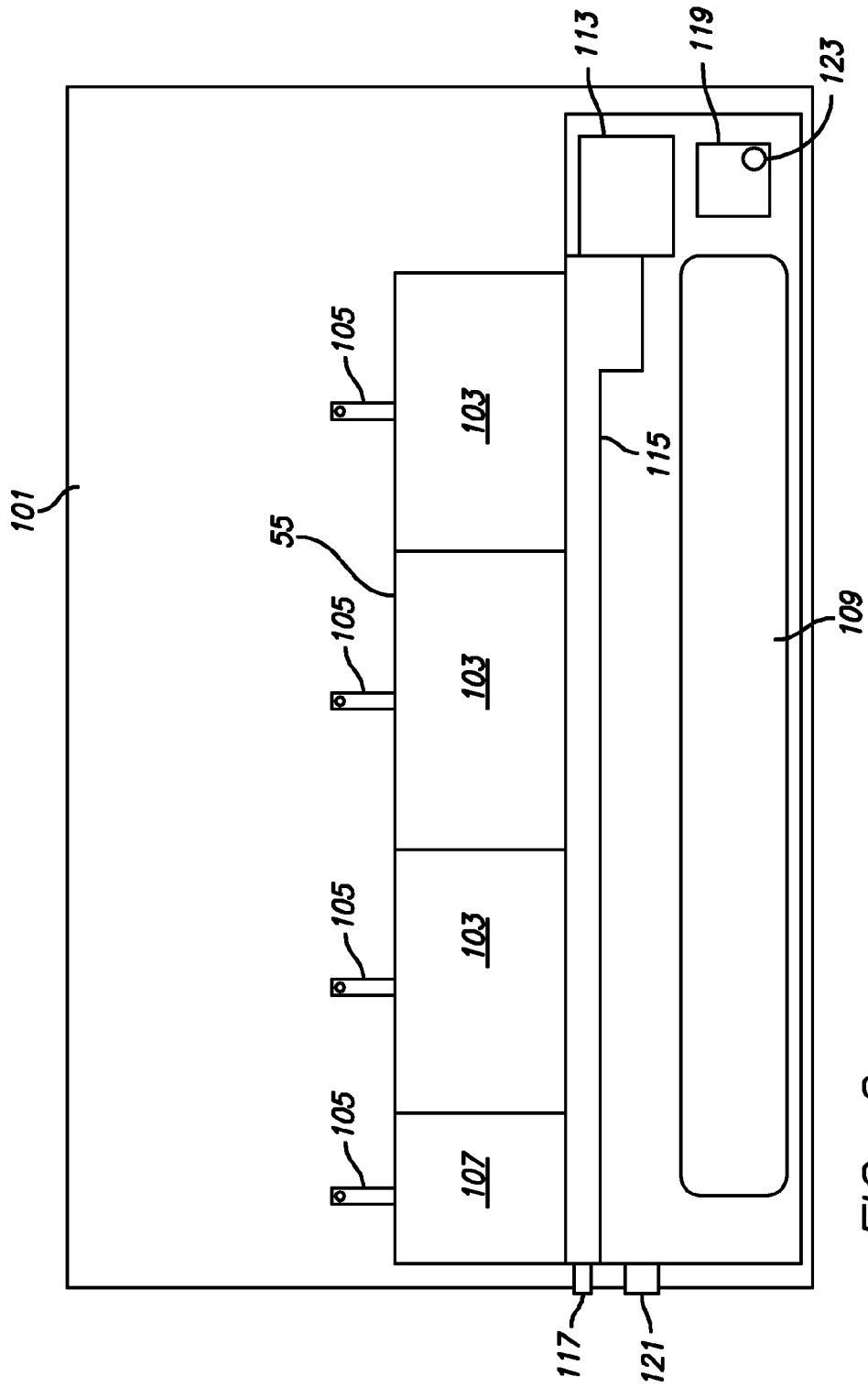
FIG. 2 schematically illustrates installed kitchen equipment along a first interior wall of the mobile kitchen of FIG. 1.

FIG. 2 shows the interior back wall 101 of the mobile kitchen 11 with the sanitation unit 55. The sanitation unit 55 includes a three partition sink 103, each partition with its own spigot 105. A fourth sink 107 and water spigot 105 are included for hand washing. Each of the water spigots 105 draws water from the potable water tank 67 and drains into the gray water storage tank 109 placed in the space below the sanitation unit 55. The sanitation unit 55 includes a fuel burner 113 which directs the products of combustion into a heating channel 115 designed to heat water within each sink 103 of the sanitation unit 55. Again, the details of design and operation of the sanitation unit are described in U.S. Pat. No. 6,453,487. After the products of combustion are used to heat water in the sanitation unit 55, they are directed to the exterior of the mobile kitchen 11 through a vent 117. In order to help attenuate noise and contain the heat generated by the fuel burner, one or more cover panels are placed over the front and underside of the sanitation unit 55 so that the grey water tank 109 and fuel burner 113 are concealed from view and separated from the workspace within the trailer. The covers also create an additional layer over the sides of the sinks 103 so that the entire side of the sanitation unit 55 is cool to the touch. Even a simple stainless steel panel suffices to significantly reduce the noise created by the fuel burner and create an air channel to help keep excess heat out of the workspace. However, without more than just the panels, heat would still build up in this space and eventually spill over into the workspace. Therefore, an air blower 119 is included within this space to draw air from within the workspace, through an aperture 123 in the panel, into the air channel created by the cover panel. Alternatively, air may be drawn directly from the exterior of the mobile kitchen 11. A second vent 121 connects this air channel to the exterior of the mobile kitchen 11 so that air drawn in by the blower 119 is forced out of the vent 121. With this arrangement, air is continuously circulated through air channel and excess heat from the fuel burner 113 is directed toward the exterior of the mobile kitchen 11.

Figure 3:
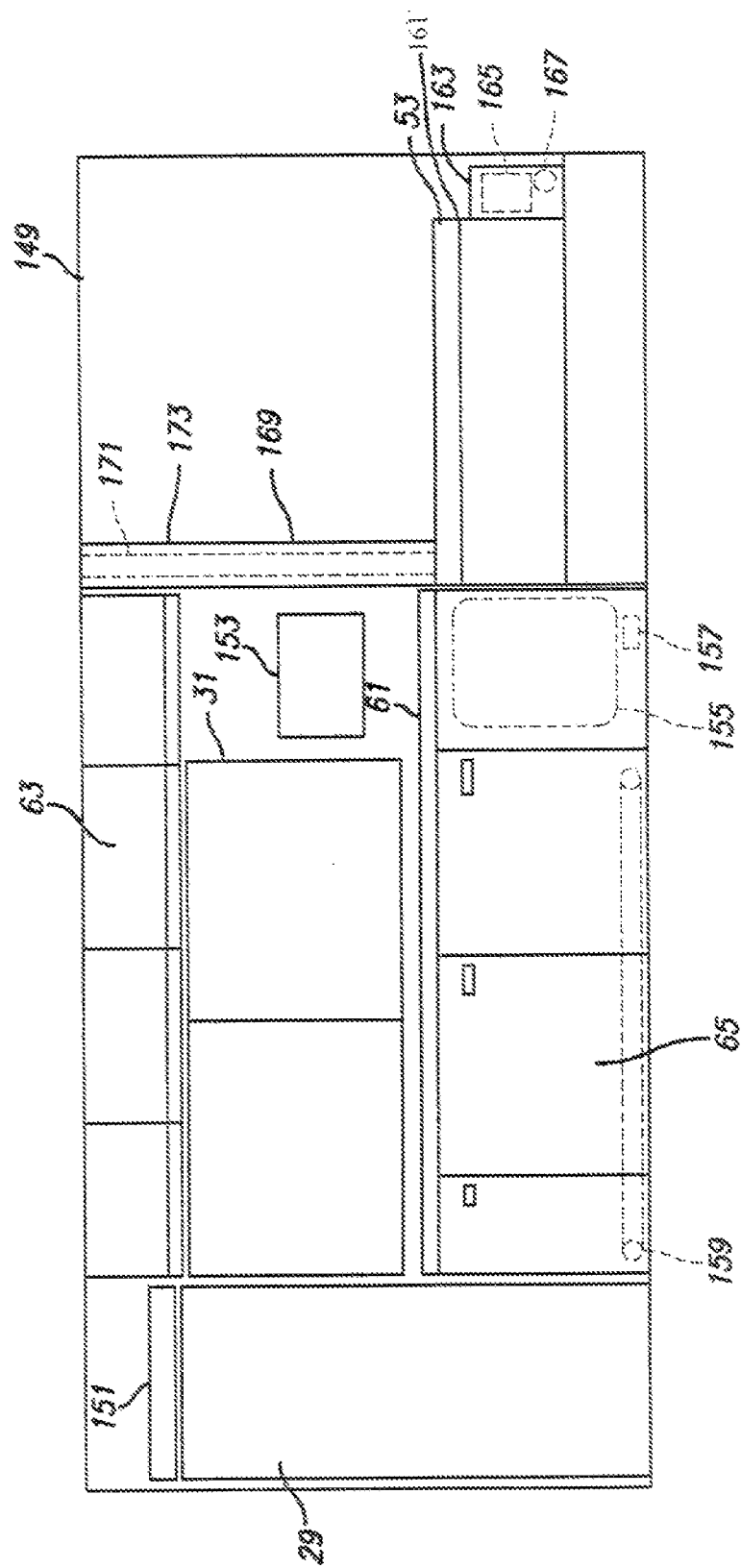
FIG. 3 schematically illustrates installed kitchen equipment along a second interior wall of the mobile kitchen of FIG. 1.

The second interior wall 149 of the mobile kitchen 11, which includes the service window 31 is shown in FIG. 3. The side door 29 is shown on the left and includes an air curtain blower 151 above it. The four overhead cabinets 63 for storage space are included above the service window 31, and the monitor 153 for the computer system 71 is set into the wall just to the right of the service window 31. The service counter 61 has four lower storage spaces 65 below it, the rightmost of which includes the potable water tank 155 and a pump 157 for the potable water. The potable water may be pumped to any spigot within or outside of the mobile kitchen 11 as desired. The potable water pump 157 is configured to activate and provide water pressure to any spigot on demand. The other three lower storage spaces 65 have access doors, but do not run the full depth of the service counter 61. Instead, as previously indicated, another storage space 69, preferably configured for portable five gallon water tanks, is included under the service counter 61 adjacent the housing wall. The access point for this additional storage space is adjacent the door 29, and the base wall of the storage space 69 is formed by the conveyor system 159, which may have its activation switch (not shown) disposed at any convenient location, but preferably immediately adjacent the access door for this storage space 69. On the right side is the tray ration heater 53, as described in U.S. Pat. No. 7,100,599, which is secured above another storage space 161. This additional storage space 161 may be appropriately sized for any purpose, but as shown is configured for storage of up to three foldable tables (not shown). The tray ration heater 53 includes a cover 163 over the fuel burner 165, which provides heat to the appliance. The cover 163 is preferably interiorly lined with sound and/or heat insulation to aid in isolating the burner 165 from the workspace within the mobile kitchen 11. A blower 167 is also included within the cover 163, drawing air from within the workspace, though an aperture in the cover 163, and directing it into and around the fuel burner. Exhaust from the burner 165 for the tray ration heater 53 is vented through an exhaust column 169, which runs up to the roof of the mobile kitchen 11. This exhaust column 169 is double walled, with the interior walls 171 forming the primary exhaust channel, and the exterior walls 173 providing primarily a protective and cosmetic cover.

Figure 4:
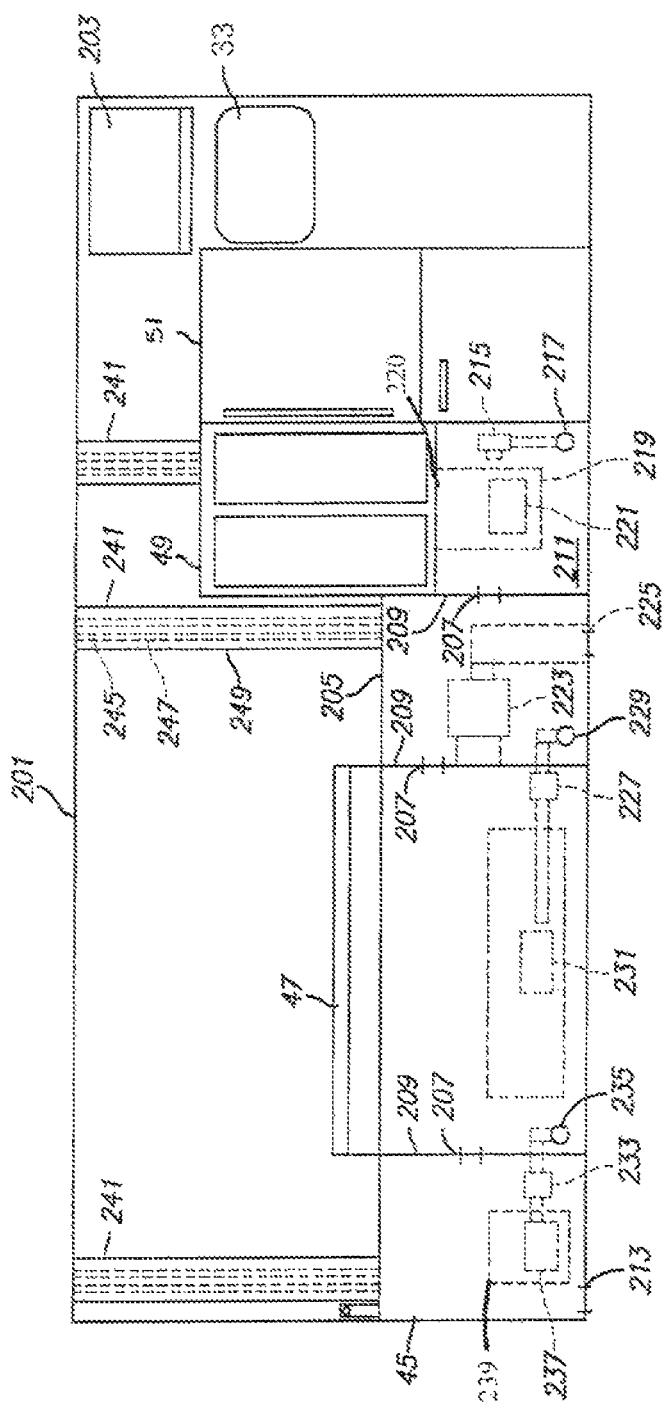
FIG. 4. schematically illustrates installed kitchen equipment along a third interior wall of the mobile kitchen of FIG. 1.

The third interior wall 201 of the mobile kitchen 11 is shown in FIG. 4. On the right side of this wall 201, which would be adjacent the hand sink on the back wall, are a small storage cabinet 203 above the secondary window 33. Next to that is the refrigerator 51, then the convection oven 49, a small food preparation counter 205, the griddle 47, and then the stock pot cooker 45. The stock pot cooker 45 includes a water spigot 239 which draws from the potable water source, so that a stock pot may be easily placed on the cooker 45 and filled with water. For each of the heated appliances, the fire box and liquid fuel burner are shown underneath the appliance. Like the sanitation unit, the lower portion of each appliance has a cover to isolate the air space underneath the appliance from the general workspace. The covers, which may be as simple as a stainless steel sheet, aid in isolating excess heat and noise generated by the fuel burner from the general workspace within the mobile kitchen 11. The food preparation counter 205 also includes a cover panel to create a separate space beneath it as well. Further, each of these separate spaces is fluidically connected by apertures 207 in the walls 209 adjoining each of the appliances. By linking these chambers, an air channel 211 is created that runs from beneath the convection oven 49, through the space underneath the food preparation counter 205, continuing through the space underneath the griddle 47, and into the space underneath the stock pot cooker 45. The vent port 213 connects the space underneath the stock pot cooker 45 with the underside of the mobile kitchen 11, so that air flowing through this air channel 211 can be vented to the underside of the mobile kitchen 11.

Air is drawn into the channel 211 through several different air blowers. Underneath the convection oven, a blower 215 draws air from within the workspace, through an aperture 217 in the cover, and directs that air onto and about the fire box 219 and fuel burner 221 having a heating channel 220 downstream from the fire box 219, for the convection oven 49. A second, larger air blower 223, disposed underneath the food preparation surface 205, pulls air from the underside of the mobile kitchen 11 through an aperture 225 in the floor and directs that air into the space underneath the griddle 47. A third blower 227, disposed underneath the griddle 47, pulls air from the workspace, through an aperture 229 in the panel placed over the underside of the food preparation surface 205. This blower 227 directs air onto the fuel burner 231 under the griddle 47. This is done because it was discovered that as hot air proceeds from the space underneath the convection oven 49 into the space underneath the griddle 47, it is heated and drawn in by the liquid fuel burner for use as part of the combustion process. However, because that air is heated, the liquid fuel burner tends to run hotter than desired. Therefore, the third blower 227 directs air from the workspace within mobile kitchen 11 directly onto the liquid fuel burner 231, so that the liquid fuel burner 231 has a cooler air source to draw from and runs closer to a desired temperature. This configuration also has another beneficial effect in that it creates positive air pressure going into the liquid fuel burner 231, so that, whether combustion is occurring or not, while the blower 227 is on, air flows through into the blower and through the griddle 47. Heat flow within the griddle 47, therefore, is always in the direction of the exhaust, as described in further detail below. The fourth air blower 233, disposed underneath the stock pot 45, serves a similar purpose. It draws air from the workspace within the mobile kitchen 11, through an aperture 235 in the cover for the griddle 47, and directs that air onto the fuel burner 237, which provides heat to the stock pot cooker 45.

Exhaust from each of the three heated appliances on this wall 201 is directed up through one of three exhaust columns 241. Each exhaust column 241 is triple walled, with the interior most walls 245 enclosing and carrying the products of combustion from the associated liquid fuel burner. The space enclosed by the interior most walls 245 and the secondary walls 247 is connected directly to the air channel 211 underneath the appliances, such that the same air that is used to carry excess heat to the exterior of the mobile kitchen 11 is also used to aid in cooling the products of combustion as they rise up through the exhaust columns 241. Finally, the exterior most walls 249 of the exhaust columns 241 serves as both a cosmetic feature and as protective covers over the double walled interior portion, making them cool to the touch.

As described above, a single air channel 211 is created which substantially isolates the excess heat and sound generated by each of the liquid fuel burners associated with the heated appliances on this wall, so that most of that excess heat and sound does not escape into the workspace within the mobile kitchen 11. Rather, the sound is deadened by the covers used to help form the air channel 211, and the excess heat is carried out of the air channel 211 by the air drawn in the blowers and forced to the exterior of the mobile kitchen 11 through both the vent to the underside of the mobile kitchen 11 and the exhaust columns 241.

Figure 5:
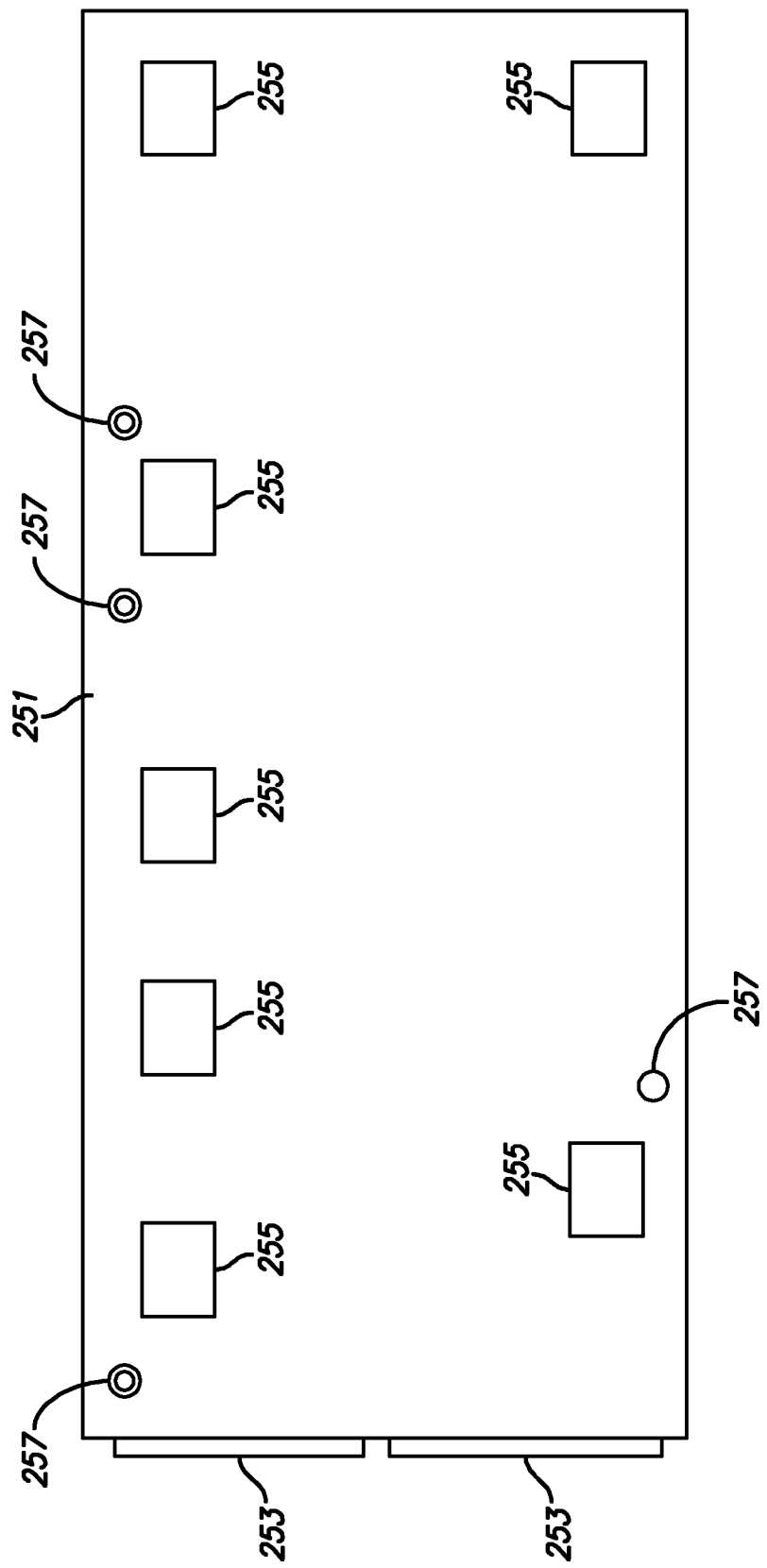
FIG. 5 schematically illustrates vents on the roof of the mobile kitchen of FIG. 1.

The roof 251 of the mobile kitchen 11 is shown in FIG. 5. Two air curtain blowers 253 are positioned to direct air curtains down over the opening created when the rear gate is lowered. Seven blowers 255 are disposed on the roof 251 to draw air from within the workspace and vent that air to the exterior of the mobile kitchen 11. Each blower 255 is positioned over the primary heat sources within the mobile kitchen, with one blower 255 each being disposed over each of the tray ration heater, the stock pot cooker, and the convection oven, and two blowers 255 being located over the griddle and the sanitation unit. Each blower 255 is selected to vent a predetermined volume of air from within the workspace at least once every minute. Preferably, this predetermined volume is equal to the volume of the workspace, however, more or fewer blowers may be used depending on the particular specifications of the blowers installed and blowers with greater or lesser volume displacement may be used. In addition, each blower 255 preferably displaces air at a low enough velocity so as not to draw grease particles up to the interior ceiling of the mobile kitchen. By appropriate selection of blowers (and blower velocity), grease particles will not be drawn up and out of the mobile kitchen, and will instead tend to settle on walls near open cooking appliances, such as the stock pot cooker and the griddle, and on the interior walls of other cooking appliances, such as the convection oven, where it can be easily cleaned up following use of the mobile kitchen 11.

As shown, the seven blowers 255 effectively change the air within the workspace seven times per minute, such that excess heat that may be created through the cooking process, or which escapes from the air channels into the workspace, is significantly reduced by the constantly changing air within the workspace. The positioning of each of the vents 257 from the exhaust columns is also shown. While the products of combustion from the liquid fuel burners are very clean and non-toxic, in order to ensure that no issues arise from mixing the products of combustion with air drawn into the workspace of the mobile kitchen, exhausts from each of the appliances is preferably placed onto a different side of the trailer from any air intake port.

As described above, the most significant source of heat in the mobile kitchen is radiative heat from each of the appliances. The air channels formed around the heat sources for each of the appliances, namely the burners and the fire boxes, aid in removing the excess heat from the mobile kitchen. In addition, during operation of the appliances, the blowers are configured to continue running even after the appliances have been turned off and combustion is no longer ongoing. This serves two purposes. First, residual heat continues to flow from the various fire boxes, through the respective appliances, and up through the exhaust columns. Thus, even when the burners are initially turned off, heat retained within the fire boxes continues to heat the appliances and enable further cooking. Through this heat dissipation mechanism, residual heat is purged out of the mobile kitchen 11. Importantly, the residual heat does not escape into the workspace of the mobile kitchen 11 because the blowers continue to direct air currents through the fire boxes, up through the appliances and out through the exhaust columns. Further, air continues to flow around the fuel burners and fire boxes and out to the underside of the mobile kitchen 11. Thus, radiative heat from the fire boxes continues to be dumped to the underside of the mobile kitchen 11, and also does not escape into the workspace. It has been found that, even during operation of the appliances that the panels used to form the air channels remain extremely cool to the touch, indicating that little to no radiative heat from the fuel burner or the fire boxes escapes into the workspace of the mobile kitchen 11. Thus, substantially all of the excess heat generated by the fuel burners and fire boxes is kept out of and isolated from the workspace. With the above-described design, forced convective heating is substantially, if not entirely, eliminated from within the mobile kitchen 11, rendering a workspace that stays cooler than mobile kitchens known in the prior art.

Thus, a mobile kitchen is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A mobile kitchen comprising:
a housing disposed atop one or more wheel axles;
a plurality of appliances disposed within the housing, each appliance being heated by combustion of a distillate fuel and including a heating channel within the appliance for providing working heat to the appliance and an exhaust channel, wherein products of combustion are directed through respective heating channels and into respective exhaust channels, each exhaust channel being configured to vent products of combustion from the appliances to an exterior of the housing;
one or more air channels disposed about a lower internal heating portion of each of the appliances and separated from the exhaust channels, each air channel substantially thermally isolating the lower internal portion of the appliances and excess heat from combustion of the distillate fuel from a workspace within the housing;
one or more first air blowers associated with the air channels, wherein the first air blowers are adapted to force air through the air channels such that the excess heat within the air channels is vented to the exterior of the housing through one or more vent ports; and
one or more second air blowers coupled to the housing, wherein each second air blower is adapted to vent a predetermined volume of air from within the workspace at least once per minute.

2. The mobile kitchen of claim 1, wherein a first of said one or more air channels is disposed about a lower portion of two or more of the appliances that are adjacent to one another.

3. The mobile kitchen of claim 1, wherein each of said one or more air channels vents to an underside of the housing.

4. The mobile kitchen of claim 1, wherein at least one of the first air blowers draws air from an underside of the housing.

5. The mobile kitchen of claim 4, wherein each exhaust channel vents to an exterior of the housing on a side different from which the first air blowers draw air.

6. The mobile kitchen of claim 1, wherein the exhaust channel for at least one of the appliances vents to a top side of the housing.

7. The mobile kitchen of claim 1, wherein each exhaust channel comprises double-walls within the housing.

8. The mobile kitchen of claim 7, wherein a space between the double walls is cooled by air from one or more of the air channels.

9. The mobile kitchen of claim 1, wherein one of said one or more first air blowers directs air into a liquid fuel burner adapted to heat one of the appliances.

10. The mobile kitchen of claim 1, wherein the one or more second air blowers comprise seven second air blowers.

11. The mobile kitchen of claim 1, further comprising a potable water reservoir coupled to at least one spigot.

12. The mobile kitchen of claim 1, wherein the predetermined volume of air is at least a volume of the workspace.

13. The mobile kitchen of claim 1, wherein the air channels attenuate noise created by combustion.

14. The mobile kitchen of claim 1, wherein one of the appliances comprises a convection oven.

15. The mobile kitchen of claim 1, wherein one of the appliances comprises a griddle.

16. The mobile kitchen of claim 1, wherein one of the appliances comprises a stock pot cooker.

17. The mobile kitchen of claim 1, wherein one of the appliances comprises a sanitation unit.

18. The mobile kitchen of claim 17, further comprising a grey water reservoir coupled to the sanitation unit.

19. The mobile kitchen of claim 1, further comprising a storage space having a wall formed by a conveyor belt system.

* * * * *